Patented Apr. 9, 1929.

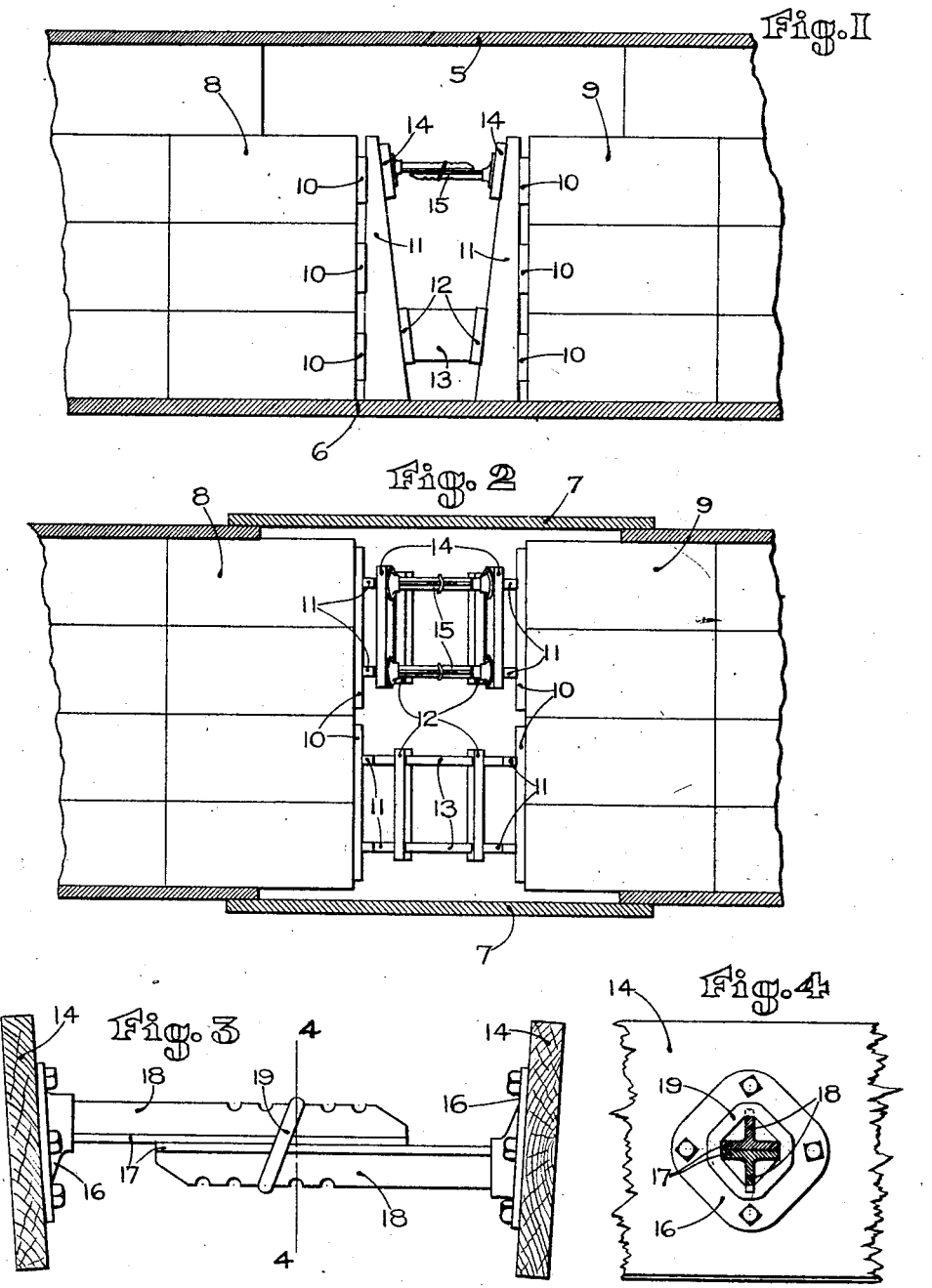

1,708,413

UNITED STATES PATENT OFFICE.

HERBERT E. FOWLER, OF ROCHESTER, NEW YORK, ASSIGNOR TO NORTH EAST ELECTRIC COMPANY, OF ROCHESTER, NEW YORK, A CORPORATION OF NEW YORK.

FREIGHT BRACE.

Application filed December 29, 1927. Serial No. 243,426.

This invention relates to means by which freight in a freight car or other vehicle may be held securely against longitudinal motion.

The object of the invention is to provide a brace, for the purpose in question, which is so constructed that any longitudinal looseness between the freight and the vehicle which may occur during transportation, particularly in consequence of the shocks produced in starting and stopping the vehicle, will be taken up automatically, so that any substantial endwise motion will be prevented.

To the foregoing end the present invention consists in a brace comprising one or more followers, adapted to engage a stack of freight, and one or more wedging members, cooperating with the follower or followers and free to descend, under the influence of gravity, so as to eliminate any space for end-play which may occur during the transportation of the freight.

In the accompanying drawings Figs. 1 and 2 are, respectively, a side elevation and a plan view showing followers embodying the present invention, together with the freight with which they cooperate, and a portion of a freight car, shown in section. Fig. 3 is a side elevation, on a larger scale, of an adjustable wedging member such as may be used in connection with the present invention, and Fig. 4 is a detail sectional view of the same wedging member.

The invention is shown as used in connection with freight in a freight car, for which it is particularly adapted, although it may obviously be used to brace freight in motor trucks or other vehicles. In the drawings, the middle portion of a freight car is shown in section, comprising the roof 5, the floor 6 and the two doors 7. Two bodies of freight are shown, comprising boxes or cases piled up in stacks and it will be understood that these stacks are supposed to extend to and rest against the ends of the car, the car being loaded from the ends toward the center, with a space in the middle. The brace, embodying the present invention, is shown as comprising two followers resting against the opposed ends of two stacks of the freight. Each follower comprises a plurality of bars 10, which may be made of ordinary planks with their lengths horizontal. The several bars of the follower are connected together by two vertical cleats 11, each of which may be made of a piece of plank, and the bars are nailed or otherwise secured to the cleats. Preferably, a bar is used at the level of each tier of cases.

As shown in the drawings, each of the cleats 11 is made tapering in form, so as to provide an edge surface which is inclined from top to bottom, the opposite faces of the corresponding cleats being downwardly convergent. Co-operating with these followers are one or more wedging members, which may have the various forms. The essential feature of the wedging member is that when the freight has been packed as closely as convenient and the followers put in place, the wedging member may be laid in the space between the cleats, extending horizontally across two or more of the cleats and engaging and supported by the convergent faces of the cleats. Where the car is so packed that the space between the followers is small, a solid bar or beam may be used as a wedging member, whereas, in the case of a greater space, a wedging member of built-up form is preferable. In either case the wedging member, since it is not attached to the followers, is free to descend under the influence of gravity. Accordingly, during the transportation of the freight, if any endwise movement of the freight occurs, as a result of the shocks and vibrations incident to transportation, or of any shrinkage which may occur in the freight or of any inadvertent failure to pack the freight closely, the wedging member will descend under the influence of gravity, assisted by the vibrations of the vehicle, and will thus wedge the followers further apart so as to take up the undesirable space and continue to retain the freight securely against longitudinal shifting.

Where the freight is stacked high in the car, it is preferable to use two wedging members between each pair of followers, one member located near the tops of the followers and the other at a lower point. The lower wedging member should, however, be of a width such that when resting against the convergent surfaces of the follower, it will be far enough above the floor of the vehicle to permit a substantial downward movement in the performance of its function.

Two forms of wedging members are shown in the drawings. The lower members each comprise two lengths of plank 12, connected by struts 13 which may also be made of plank, the planks 12 and 13 being nailed or otherwise secured together. Wedging members of this form may be readily and cheaply made up as required, and of dimensions suitable for the space between the followers. Where freight is repeatedly shipped between two given points, however, and the braces may be habitually returned to the point of shipment, it may be preferable to use wedging members of a more permanent character, and to make these members adjustable. Accordingly, I have shown, in Figs. 3 and 4, a wedging member comprising two planks 14 connected by adjustable struts 15. Each strut comprises a plate 16, screwed to one of the planks, and a stem projecting rigidly from the plate and comprising a piece of T-bar having a horizontal web 17 and a flange 18. The opposite T-bars are reversely positioned, so their webs may rest against each other, and each flange is provided with a series of notches. A connecting ring 19, adapted to seat in the notches as shown in Fig. 3, completes the adjustable strut, and it will be obvious that the effective length of the strut may be changed by swinging the ring into engagement with different notches.

In Fig. 2 struts of both of the kinds described are shown as interposed between one pair of followers, whereas the other pair of followers is shown as cooperating with a single wedging member of the form first described.

While both followers of each pair are shown as provided with cleats having inclined surfaces, it will be obvious that this is not necessary, since downwardly convergent opposite surfaces or faces may be provided if the cleats or corresponding parts of only one of the followers of a pair are so inclined. It will also be obvious that the brace may be used not only between the adjacent ends of two stacks of freight, but also between a stack of freight and the end of a car or other vehicle, and in this case only one follower need be used, since the wedging members may be interposed between this follower and the end of the vehicle.

The invention claimed is:

1. A freight brace, for introduction between the end of a body of freight and any suitable opposed surface, comprising a follower adapted to engage the freight and having a surface downwardly convergent with said opposed surface, and a wedging member resting between and against the two said surfaces and free to descend, under the influence of gravity, upon the occurrence of movement of the follower away from said opposed surface.

2. A freight brace, for introduction between the ends of two bodies of freight, comprising two followers adapted to engage the freight and having opposed surfaces which are downwardly convergent, and a plurality of wedging members resting loosely between and against said surfaces, at different levels, and free to descend independently, under the influence of gravity, upon the occurrence of movement of either of the followers away from the other.

3. A freight brace, as set forth in claim 1, in which the follower comprises a plurality of bars with their length horizontal, and a plurality of vertical cleats secured to the bars and gradually widening from top to bottom.

4. A freight brace, as set forth in claim 1, in which the wedging member comprises two planks, with their length horizontal, and horizontal struts connecting the planks and holding them rigidly with their faces downwardly convergent.

5. A freight brace, as set forth in claim 1, in which the wedging member comprises two planks with their length horizontal, and horizontal struts connecting the planks, adjustable in length, and formed and adapted to hold the planks rigidly with their faces downwardly convergent.

HERBERT E. FOWLER